(12) United States Patent
Yang et al.

(10) Patent No.: US 12,317,891 B2
(45) Date of Patent: Jun. 3, 2025

(54) PROTEIN PRODUCT CAPABLE OF IMMOBILIZING TARGET AND BEING CLEARED AS REQUIRED

(71) Applicant: SHAANXI NORMAL UNIVERSITY, Xi'an (CN)

(72) Inventors: Peng Yang, Xi'an (CN); Hao Su, Xi'an (CN); Qian Han, Xi'an (CN)

(73) Assignee: SHAANXI NORMAL UNIVERSITY, Xi'an (CN)

( * ) Notice: Subject to any disclaimer, the term of this patent is extended or adjusted under 35 U.S.C. 154(b) by 470 days.

(21) Appl. No.: 17/802,984

(22) PCT Filed: Apr. 23, 2020

(86) PCT No.: PCT/CN2020/086453
§ 371 (c)(1),
(2) Date: Aug. 29, 2022

(87) PCT Pub. No.: WO2021/169014
PCT Pub. Date: Sep. 2, 2021

(65) Prior Publication Data
US 2023/0100971 A1    Mar. 30, 2023

(30) Foreign Application Priority Data
Feb. 29, 2020 (CN) .......................... 202010132406.0

(51) Int. Cl.
*A01N 25/10* (2006.01)
*C05G 3/50* (2020.01)
(Continued)

(52) U.S. Cl.
CPC .............. *A01N 25/10* (2013.01); *C05G 3/50* (2020.02); *C05G 5/30* (2020.02); *C09D 189/00* (2013.01)

(58) Field of Classification Search
CPC . A01N 25/10; C05G 5/30; C05G 3/50; C09D 189/00
See application file for complete search history.

(56) References Cited

FOREIGN PATENT DOCUMENTS

| CN | 109731137 A | * | 5/2019 |
| CN | 109821076 A | * | 5/2019 |

OTHER PUBLICATIONS

Eng Trans of CN-109821076-A, May 31, 2019. (Year: 2019).*

(Continued)

*Primary Examiner* — Blessing M Fubara
(74) *Attorney, Agent, or Firm* — Bayramoglu Law Offices LLC (57) ABSTRACT

A protein product capable of immobilizing a target and being cleared as required includes a protein (lysozyme, bovine serum albumin (BSA), whey albumin, insulin, α-lactalbumin, fibrinogen, ribonuclease A, cytochrome c, α-amylase, horseradish peroxidase (HRP), pepsin, myoglobin, collagen, keratin, or the like), a protein modifier (a strong oxidizing agent or a strong reducing agent), and a matter to be immobilized (a coating, a pesticide, a chemical fertilizer, a cosmetic, a medical drug, or the like). A protein film can be generated through the phase transition of the protein to immobilize the matter to be immobilized on a target surface, thereby improving the utilization rate of the matter to be immobilized and reducing the resource waste and environmental pollution caused by the loss of the matter to be immobilized. In addition, after the protein film is decomposed, the matter to be immobilized will also be effectively cleared.

5 Claims, 3 Drawing Sheets

(51) Int. Cl.
 *C05G 5/30* (2020.01)
 *C09D 189/00* (2006.01)

(56) References Cited

OTHER PUBLICATIONS

Eng Trans of CN-109731137-A, May 10, 2019. (Year: 2019).*
Jin Gu, et al., Multiplex Binding of Amyloid-like Protein Nanofilm to Different Material Surfaces, Colloid and Interface Science Communications, 2018, pp. 1-7 vol. 22 No. 42-48.
Peng Yang, Direct Biomolecule Binding on Nonfouling Surfaces via Newly Discovered Supramolecular Self-Assembly of Lysozyme under Physiological Conditions, Macromolecular Bioscience, 2012, pp. 1-7.
Ruirui Liu, et al., One-Step Assembly of a Biomimetic Biopolymer Coating for Particle Surface Engineering, Advanced Materials, 2018, pp. 1-9, vol. 1802851.
Chen Li, et al., Amyloid-Like Rapid Surface Modification for Antifouling and In-Depth Remineralization of Dentine Tubules to Treat Dental Hypersensitivity, Advanced Materials, 2019, pp. 1-11, 1903973.
Chen Li, et al., Tuning Protein Assembly Pathways through Superfast Amyloid-Like Aggregation, Biomaterials Science, 2018, pp. 1-7, vol. 6 No.4.
Yi Wang, et al., Covalent immobilization of biomolecules on stent materials through mussel adhesive protein coating to form biofunctional films, Materials Science & Engineering C, 2020, pp. 1-11, vol. 106 No. 110187.
Haishan Qi, et al., Bioinspired Multifunctional Protein Coating for Antifogging, Self-Cleaning, and Antimicrobial Properties, ACS Applied Materials Interfaces, 2019, pp. 24504-24511, vol. 11.
Joana Odila Pereira, et al., Impact of whey protein coating incorporated with Bifidobacterium and Lactobacillus on sliced ham properties, Meat Science, 2018, pp. 1-39, vol. 139.
Leonor Pérez-Fuentes, et al., Adsorption of Milk Proteins (β-Casein and β-Lactoglobulin) and BSA onto Hydrophobic Surfaces, Materials, 2017, pp. 1-25, vol. 10 No. 893.

* cited by examiner

PROTEIN PRODUCT CAPABLE OF IMMOBILIZING TARGET AND BEING CLEARED AS REQUIRED

CROSS REFERENCE TO THE RELATED APPLICATIONS

This application is the national phase entry of International Application No. PCT/CN2020/086453, filed on Apr. 23, 2020, which is based upon and claims priority to Chinese Patent Application No. 202010132406.0, filed on Feb. 29, 2020, the entire contents of which are incorporated herein by reference.

TECHNICAL FIELD

The present disclosure belongs to the technical field of biomaterials, and specifically relates to the use of a protein film to immobilize a target, which can improve the utilization rate of the target (such as a coating, a pesticide, a chemical fertilizer, a cosmetic, and a drug) and avoid problems, such as environmental pollution and resource waste, caused by a loss of the target.

BACKGROUND

Pesticides play a vital role in agriculture. Without pesticides, losses in fruits, vegetables, and grains caused by insect infestation may reach 78%, 54%, and 32%, respectively. Pesticides can protect crops from pests and plant pathogens and ensure the quality and yield of crops, thereby providing abundant foods for the growing world's population. Currently, pesticides are widely applied to crops, vegetables, fruits, and other plants in the plant kingdom. However, due to the hydrophobic/superhydrophobic characteristics of plant leaves, pesticide droplets bounce or splash when hitting the plant leaves during use, resulting in over 50% pesticide loss. The pesticide, after being sprayed, only contacts a small part of a plant surface. The small amount of pesticide contacting the plant surface may enter the groundwater, air, and soil due to erosion, evaporation, and rainwater. This causes the overuse of pesticides and severe environmental pollution, thus posing harmful effects on human health, endangered species, and ecosystems. It is common to enhance the attachment of pesticide to the plant surface by adding a polymer solution or a surfactant to the pesticide or charging pesticide droplets. However, this method is not encouraged given that surfactants are not environmentally friendly and may cause secondary pollution to the environment. In addition, this method neglects the influence of other natural conditions, such as rain wash, on pesticides. There are also other methods, for example, a high-energy electron beam-modified natural attapulgite may be used to control the loss of a pesticide from a plant surface, a polydopamine (PD) microcapsule may be used to prolong the retention time of a pesticide on a leaf surface, or a nano-pesticide may be used. However, these methods are not generally applicable in the plant kingdom and do not show an excellent ability to immobilize pesticides.

Coatings are very common in the construction industry and can beautify and protect an exterior wall of a building, such that the interior of the building will not be corroded by acid rain or the like. However, due to the variability of the natural environment and the inevitable activities of human beings, a coating that has been applied to a building may peel off from the building wall due to rain wash, resulting in property loss and environmental pollution. Current waterproof coatings commercially available on the market have the problems of non-environmentally friendly components and poor weather resistance. Therefore, there is an urgent need to immobilize a coating on a surface of a building such that the coating can be prevented from being washed away by rainwater and corroded by acid rain, thereby reducing the penetration of rainwater into a wall surface and decreasing the corrosion to a wall surface to diminish the loss.

Cosmetics, such as sunscreen, are often smeared on a skin surface to protect the skin from ultraviolet (UV) rays, but sweat, rainwater, daily water, and light will reduce the amount of sunscreen left on the skin. As a result, the skin may be exposed to UV rays and produce problems, such as skin darkening, skin becoming sunburnt, and skin aging. Thus, sunscreen often needs to be applied multiple times. Therefore, it is necessary to extend the time that sunscreen stays on the skin and reduce the number of sunscreen applications.

Drugs are commonly used in daily life to prevent, treat, and diagnose human diseases and purposefully adjust human physiological functions. For example, a traumatic injury spray is often sprayed on an affected part to promote blood circulation and remove blood stasis, alleviate pain, and promote recovery. However, drugs may be easily washed away due to daily activities, greatly compromising protective and medical effects. Therefore, there is a need for an immobilization method that is capable of achieving a long action time and resisting water wash, involves safe components, and is friendly to the human body.

SUMMARY

Technical Problem

The present disclosure is intended to provide a protein product that exhibits a high immobilization capacity for a matter to be immobilized and can be cleared as required. The protein product has high stability and can exist stably under various conditions (high temperature, low temperature, light, simulated acid rain environment, microbial environment, and organic solvent).

Technical Solutions

In view of the above objective, the present disclosure provides a protein product capable of immobilizing a target and being cleared as required, including the following components in parts by weight:

10 to 600 parts of a protein,
10 to 600 parts of a protein modifier, and
100 parts of a matter to be immobilized.

The protein described above is one or more selected from the group consisting of lysozyme, bovine serum albumin (BSA), human serum albumin (HSA), whey albumin, insulin, α-lactalbumin, fibrinogen, β-lactoglobulin, ribonuclease A, cytochrome c, α-amylase, horseradish peroxidase (HRP), pepsin, myoglobin, albumin, collagen, and keratin.

The matter to be immobilized is any one selected from the group consisting of a coating, a cosmetic, a medical drug, a pesticide, and a chemical fertilizer.

The protein modifier is a strong reducing agent or a strong oxidizing agent. When the matter to be immobilized is the cosmetic or medical drug, the strong reducing agent may be one or more selected from the group consisting of tris(2-carboxyethyl)phosphine hydrochloride (TCEP-HCL), cysteine, and reduced glutathione, and the strong oxidizing agent may be one or more selected from the group consisting of hydrogen peroxide, ozone, and sodium ferrate. When the matter to be immobilized is any one selected from the group consisting of the coating, the pesticide, and the chemical fertilizer, the strong reducing agent may be one or more selected from the group consisting of dithiothreitol (DTT), β-mercaptoethanol (β-ME), TCEP-HCL, cysteine, and reduced glutathione, and the strong oxidizing agent may be one or more selected from the group consisting of a trivalent cobalt salt, a chlorate, potassium permanganate, a persulfate, potassium dichromate, concentrated sulfuric acid, hydrochloric acid, nitric acid, hydrobromic acid, hydroiodic acid, perchloric acid, ozone, hydrogen peroxide, a fluorine gas, a chlorine gas, sodium bismuthate, periodic acid, sodium ferrate, lead dioxide, guanidine hydrochloride (GuHCl), urea, trifluoroethanol (TFE), hexafluoroisopropanol (HFIP), and trifluoroacetic acid (TFA).

The protein product may preferably include the following components in parts by weight
50 to 500 parts of the protein,
50 to 500 parts of the protein modifier, and
100 parts of the matter to be immobilized.

The protein product may further preferably include the following components in parts by weight:
100 to 300 parts of the protein,
100 to 300 parts of the protein modifier, and
100 parts of the matter to be immobilized.

When the matter to be immobilized is a solid, the protein, the protein modifier, and the matter to be immobilized may be directly mixed thoroughly to prepare the protein product. When in use, the protein product may be mixed with water, surfactant-containing water, or an organic solvent, and then the resulting mixture may be sprayed, smeared, dip-coated, spin-coated, or sputtered onto a target surface.

When the matter to be immobilized is any one selected from the group consisting of the coating, the pesticide, and the chemical fertilizer, the organic solvent may be any one or more selected from the group consisting of a petroleum hydrocarbon solvent, a coal tar solvent, a terpene hydrocarbon solvent, an alcohol solvent, an ester solvent, a ketone solvent, an ether ester solvent, a vegetable oil, and a mineral oil. For example, the organic solvent may be any one or more selected from the group consisting of benzene, toluene, xylene, heavy benzene, trimethylbenzene, naphthalene, alkylnaphthalene, methyl ethyl benzene, propylbenzene, chlorobenzene, carbon tetrachloride (CTC), kerosene, motor oil, white oil, diesel oil, liquid paraffin, white gasoline, isoparaffin oil, heavy oil, pentane, hexane, octane, cyclohexane, cyclohexanone, chlorobenzene, di chlorobenzene, dichloromethane (DCM), dichloroethane (DCE), chloroform, methanol, ethanol, propanol, isopropanol, butanol, isobutanol, ethylene glycol (EG), fatty alcohol, butylene glycol (BG), propylene glycol (PG), glycerol, octanol, isopentanol, TFE, HFIP, TFA, diethyl ether, petroleum ether, ethylene glycol methyl ether, ethylene glycol ethyl ether, ethylene glycol monobutyl ether, ethylene glycol ether, propylene glycol monomethyl ether, propylene glycol ether, propylene oxide, ethyl acetate, sec-butyl acetate, isoamyl citrate, fatty acid methyl ester (FAME), methyl acetate, ethyl acetate, propyl acetate, butyl acetate, acetone, butanone, methyl butyl ketone (MBK), methyl isobutyl ketone (MIBK), pyrrolidone, N-methylpyrrolidone (NMP), 2-methylacetone, acetophenone, unsaturated aliphatic ketone, cyclohexanone, isophorone, methylacetone, acetonitrile, pyridine, phenol, caprylamide, N,N-dimethylformamide (DMF), capramide, dimethylsulfoxide (DMSO), triethyl phosphate (TEP), eucalyptus oil, soybean oil, corn oil, cottonseed oil, sunflower oil, pine oil, jatropha oil, turpentine oil, rosin water, rapeseed oil, paraffin, advanced aliphatic hydrocarbon oil, epoxidized soybean oil (ESO), methylated vegetable oil, methyl phthalate, ethyl ester, dilauryl ester, and methyl benzoate.

When the matter to be immobilized is the cosmetic, the organic solvent may be any one or more selected from the group consisting of ethanol, isopropanol, n-butanol, BG, PG, glycerol, acetone, butanone, toluene, xylene, ethylhexyl palmitate, squalane, caprylic acid, polydimethylsiloxane (PDMS), cetearyl alcohol, mink oil, egg yolk oil, lanolin oil, lecithin, olive oil, coconut oil, castor oil, cottonseed oil, soybean oil, sesame oil, almond oil, peanut oil, corn oil, rice bran oil, tea seed oil, sea buckthorn oil, avocado oil, Kukui nut oil, European nut oil, walnut oil, and cacao oil.

When the matter to be immobilized is the medical drug, the organic solvent may be any one or more selected from the group consisting of benzene, CTC, 1,1-DCM, 1,2-DCM, trichloromethane (TCM), 2-methoxyethanol, 1,1,2-trichloroethylene, 1,2-dimethoxyethane, tetrahydronaphthalene (THN), 2-ethoxyethanol, sulfolane, pyrimidine, formamide, n-hexane, chlorobenzene, dioxane, acetonitrile, vinyl ethylene glycol, DMF, toluene, methanol, cyclohexane, NMP, pentane, formic acid, acetic acid, diethyl ether, acetone, anisole, 1-propanol, 2-propanol, 1-butanol, 2-butanol, pentanol, butyl acetate, tributyl methyl ether, isopropyl acetate, MEK, DMSO, isopropylbenzene, ethyl acetate, ethyl formate, isobutyl acetate, methyl acetate, 3-methyl-1-butanol, MIBK, 2-methyl-1-propanol, propyl acetate, 1,1-diethoxypropane, 1,1-dimethoxymethane, 2,2-dimethoxypropane, isooctane, isopropyl ether, methyl isopropyl ketone (MIPK), methyltetrahydrofuran (MTHF), petroleum ether, trichloroacetic acid (TCA), and TFA.

When the matter to be immobilized is any one selected from the group consisting of the coating, the pesticide, and the chemical fertilizer, the surfactant may be any one or more selected from the group consisting of AES-2EO-70, AESA-70 ammonium lauryl sulfate (ALS), K12A-70 ALS, K12A-28 ALS, K12 sodium lauryl sulfate (SLS), dodecylbenzenesulfonic acid (DBSA), triethanolamine lauryl sulfate, sec-alkyl sodium sulfate, fatty alcohol sodium isethionate, sodium N-lauroylsarcosinate, sodium N-lauroyl glutamate, amidopolyoxyethylene ether magnesium sulfate, sodium polyoxyethylene lauryl ether carboxylate, lauryl phosphate, potassium lauryl phosphate, triethanolamine lauryl phosphate, disodium laureth sulfosuccinate, sodium α-alkyl sulfonate, cocofatty add monoethanol amide, cocofatty acid diethanol amide, C12-14 alkyl glycoside, C8-14 alkyl glycoside, C12-16 alkyl glycoside, lauryl betaine, dodecyl dimethyl amine oxide, octadecyl trimethyl ammonium chloride, cetyl trimethyl ammonium chloride, ceteareth-20, lauryl glucoside polyglycerin, C16-18 alkyl glucoside, fatty alcohol ether-6, stearyl alcohol, fatty alcohol ether-25, oleyl ether, glycerol monostearate, polyacrylamide (PAM), acrylamide copolymer, Tween, sorbitol polyoxyethylene ether, lignosulfonate, saponin, tea-seed cake, alkyl naphthalene sulfonate, sodium naphthalene sulfonic acid-formaldehyde condensate, and sodium polycarboxylate.

When the matter to be immobilized is the cosmetic or the medical drug, the surfactant may be any one or more selected from the group consisting of AES-2EO-70, AESA-70 ALS, K12A-70 ALS, K12A-28 ALS, K12 SLS, triethanolamine lauryl sulfate, sec-alkyl sodium sulfate, fatty alcohol sodium isethionate, sodium N-lauroylsarcosinate, sodium N-lauroyl glutamate, amidopolyoxyethylene ether magnesium sulfate, sodium polyoxyethylene lauryl ether carboxylate, lauryl phosphate, potassium lauryl phosphate, triethanolamine lauryl phosphate, disodium laureth sulfosuccinate, sodium α-alkyl sulfonate, cocofatty acid monoethanol amide, cocofatty acid diethanol amide, C12-16 alkyl glycoside, octadecyl trimethyl ammonium chloride, cetyl trimethyl ammonium chloride, lauryl glucoside polyglycerin, C16-18 alkyl glucoside, fatty alcohol ether-6, stearyl alcohol, fatty alcohol ether-25, oleyl ether, glycerol monostearate, PAM, and acrylamide copolymer.

When the matter to be immobilized is a liquid, the protein and the protein modifier may be thoroughly mixed to obtain a component A, the matter to be immobilized may be set as a component B, and the two components may constitute the protein product. When in use, component A and component B may be thoroughly mixed and then evenly sprayed, smeared, dip-coated, spin-coated, or sputtered onto a target surface.

The protein product of the present disclosure achieves the immobilization of a matter to be immobilized on a target surface through a protein film generated from a protein. Because a protein solution has a small surface tension, most of the matter to be immobilized can remain on the target surface, and the amount of the matter immobilized can be greatly increased after the generation of the protein film. In addition, the protein film can be decomposed as required to clear the matter immobilized.

Beneficial Effects

1. The protein product of the present disclosure can be prepared by a simple preparation method and contains protein as the main additive. As such, the protein product has high biocompatibility and is environmentally friendly and safe for animals and plants.
2. The protein product of the present disclosure can be used simply, that is, the components are thoroughly mixed and then evenly sprayed, smeared, dip-coated, spin-coated, and sputtered onto a target surface.
3. The protein product of the present disclosure improves a utilization rate of a matter to be immobilized, reduces the resource waste and environmental pollution caused by the loss of the matter to be immobilized. In addition, the protein film formed on the target can be effectively removed to achieve the purpose of clearing the target, meet different usage requirements, and eliminate potential safety hazards.
4. The protein product of the present disclosure shows excellent weather resistance and can exist stably in high temperature, low temperature, acid rain, light, microbial, and organic solvent environments.

BRIEF DESCRIPTION OF THE DRAWINGS

FIGS. 3A-3F show SEM images of a protein film formed by the protein product in Example 1 that is subjected to a weather resistance test, where

DETAILED DESCRIPTION OF THE EMBODIMENTS

Example 1

A protein product in this example was prepared by thoroughly mixing 10 mg of BSA, 10 mg of TCEP-HCL, and 100 mg of buprofezin. When in use, the protein product was directly added to 10 mL of water, and the resulting mixture was gently stirred for thorough mixing and then evenly sprayed on a plant surface.

Example 2

A protein product in this example was prepared by thoroughly mixing 100 mg of BSA, 50 mg of TCEP-HCL, and 100 mg of imidacloprid. When in use, the protein product was directly added to 10 mL of water, and the resulting mixture was gently stirred for thorough mixing and then evenly sprayed on a plant surface.

Example 3

A protein product in this example was prepared by thoroughly mixing 150 mg of BSA, 100 mg of TCEP-HCL, and 100 mg, of abamectin and chlorfenapyr. When in use, the protein product was directly added to 10 mL of water, and the resulting mixture was gently stirred for thorough mixing and then evenly sprayed on a plant surface.

Example 4

A protein product in this example was prepared by thoroughly mixing 200 mg of fibrinogen, 100 mg of potassium dichromate, and 100 mg of buprofezin. When in use, the protein product was directly added to 10 mL of water, and the resulting mixture was gently stirred for thorough mixing and then evenly sprayed on a plant surface.

Example 5

A protein product in this example was prepared by thoroughly mixing 300 mg of α-lactalbumin, 300 mg of β-ME, and 100 mg of buprofezin. When in use, the protein product was directly added to 10 mL of water, and the resulting mixture was gently stirred for thorough mixing and then evenly sprayed on a plant surface.

Example 6

A protein product in this example was prepared by thoroughly mixing 500 mg of myoglobin, 300 mg of reduced glutathione, and 100 mg of buprofezin. When in use, the protein product was directly added to 10 mL of water, and the resulting mixture was gently stirred for thorough mixing and then evenly sprayed on a plant surface.

Example 7

A protein product in this example was prepared by thoroughly mixing 600 mg of lysozyme, 500 mg of DTT, and 100 mg of buprofezin. When in use, the protein product was directly added to 10 mL of water, and the resulting mixture was gently stirred for thorough mixing and then evenly sprayed on a plant surface.

Example 8

In this example, 10 mg of BSA and 15 mg of potassium permanganate were thoroughly mixed to obtain component A, 100 mg of latex coating was used as component B, and the two components constituted a protein product. When in use, component A and component B were thoroughly mixed and then evenly sprayed or smeared on a wall surface.

Example 9

In this example, 50 mg of fibrinogen and 20 mg of β-ME were thoroughly mixed to obtain component A, 100 mg of latex coating was used as component B, and the two components constituted a protein product. When in use, component A and component B were thoroughly mixed and then evenly sprayed or smeared on a wall surface.

Example 10

In this example, 100 mg of lysozyme and 50 mg of cysteine were thoroughly mixed to obtain component A, 100 mg of latex coating was used as component B, and the two components constituted a protein product. When in use, component A and component B were thoroughly mixed and then evenly sprayed or smeared on a wall surface.

Example 11

In this example, 200 mg of α-lactalbumin and 150 mg of DTT were thoroughly mixed to obtain component A, 100 mg of latex coating was used as component B, and the two components constituted a protein product. When in use, component A and component B were thoroughly mixed and then evenly sprayed or smeared on a wall surface.

Example 12

In this example, 300 mg of insulin and 300 mg of TCEP-HCL were thoroughly mixed to obtain component A, 100 mg of latex coating was used as component B, and the two components constituted a protein product. When in use, component A and component B were thoroughly mixed and then evenly sprayed or smeared on a wall surface.

Example 13

In this example, 400 mg of HRP and 300 mg of sodium bismuthate were thoroughly mixed to obtain component A, 100 mg of latex coating was used as component B, and the two components constituted a protein product. When in use, component A and component B were thoroughly mixed and then evenly sprayed or smeared on a wall surface.

Example 14

In this example, 600 mg of cytochrome c and 600 mg of reduced glutathione were thoroughly mixed to obtain component A, 100 mg of latex coating was used as component B, and the two components constituted a protein product. When in use, component A and component B were thoroughly mixed and then evenly sprayed or smeared on a wall surface.

Example 15

A protein product in this example was prepared by thoroughly mixing 10 mg of BSA, 10 mg of cysteine, and 100 mg of Biore sunscreen. When in use, the protein product was directly added to 10 mL of water, and the resulting mixture was gently stirred for thorough mixing and then evenly smeared on a skin surface.

Example 16

A protein product in this example was prepared by thoroughly mixing 100 mg of insulin, 200 mg of reduced glutathione, and 100 mg of Biore sunscreen. When in use, the protein product was directly added to 10 mL of water, and the resulting mixture was gently stirred for thorough mixing and then evenly smeared on a skin surface.

Example 17

A protein product in this example was prepared by thoroughly mixing 200 mg of fibrinogen, 200 mg of cysteine, and 100 mg of Biore sunscreen. When in use, the protein product was directly added to 10 mL of water, and the resulting mixture was gently stirred for thorough mixing and then evenly smeared on a skin surface.

Example 18

A protein product in this example was prepared by thoroughly mixing 300 mg of lysozyme, 600 mg of reduced glutathione, and 100 mg of Biore sunscreen. When in use, the protein product was directly added to 10 mL of water, and the resulting mixture was gently stirred for thorough mixing and then evenly smeared on a skin surface.

Example 19

A protein product in this example was prepared by thoroughly mixing 400 mg of α-lactalbumin, 600 mg of cysteine, and 100 mg of Biore sunscreen. When in use, the protein product was directly added to 10 mL of water, and the resulting mixture was gently stirred for thorough mixing and then evenly smeared on a skin surface.

Example 20

A protein product in this example was prepared by thoroughly mixing 500 mg of HSA, 500 mg of TCEP-HCL, and 100 mg of Biore sunscreen. When in use, the protein product was directly added to 10 mL of water, and the resulting mixture was gently stirred for thorough mixing and then evenly smeared on a skin surface.

Example 21

A protein product in this example was prepared by thoroughly mixing 600 mg of whey albumin, 600 mg of reduced glutathione, and 100 mg of Biore sunscreen. When in use, the protein product was directly added to 10 mL of water, and the resulting mixture was gently stirred for thorough mixing and then evenly smeared on a skin surface.

Example 22

In this example, 10 mg of BSA and 20 mg of cysteine were thoroughly mixed to obtain component A, 100 mg of Yunnan Baiyao aerosol was used as component B, and the two components constituted a protein product. When in use, component A and component B were thoroughly mixed and then evenly sprayed on a skin surface.

Example 23

In this example, 50 mg of α-lactalbumin and 100 mg of TCEP-HCL were thoroughly mixed to obtain component A, 100 mg of Yunnan Baiyao aerosol was used as component B, and the two components constituted a protein product. When in use, component A and component B were thoroughly mixed and then evenly sprayed on a skin surface.

Example 24

In this example, 100 mg of fibrinogen and 100 mg of reduced glutathione were thoroughly mixed to obtain component A, 100 mg of Yunnan Baiyao aerosol was used as component B, and the two components constituted a protein product. When in use, component A and component B were thoroughly mixed and then evenly sprayed on a skin surface.

Example 25

In this example, 200 mg of lysozyme and 100 mg of TCEP-HCL were thoroughly mixed to obtain component A, 100 mg of Yunnan Baiyao aerosol was used as component B, and the two components constituted a protein product. When in use, component A and component B were thoroughly mixed and then evenly sprayed on a skin surface.

Example 26

In this example, 300 mg of insulin and 400 mg of reduced glutathione were thoroughly mixed to obtain component A, 100 mg, of Yunnan Baiyao aerosol was used as component B, and the two components constituted a protein product. When in use, component A and component B were thoroughly mixed and then evenly sprayed on a skin surface.

Example 27

In this example, 400 mg of α-amylase and 500 mg of cysteine were thoroughly mixed to obtain component A, 100 mg of Yunnan Baiyao aerosol was used as component B, and the two components constituted a protein product. When in use, component A and component B were thoroughly mixed and then evenly sprayed on a skin surface.

Example 28

In this example, 600 mg of ribonuclease A and 600 mg of reduced glutathione were thoroughly mixed to obtain component A, 100 mg of Yunnan Baiyao aerosol was used as component B, and the two components constituted a protein product. When in use, component A and component B were thoroughly mixed and then evenly sprayed on a skin surface.

The present disclosure can also use other pesticides or chemical fertilizers instead of the buprofezin, imidacloprid, and abamectin and chlorfenapyr in Examples 1 to 7, use other coatings instead of the latex coating in Examples 8 to 14, use other sunscreens or cosmetics instead of the Biore sunscreen in Examples 15 to 21, and use other drugs instead of the Yunnan Baiyao aerosol in Examples 22 to 28, which are all within the protection scope of the present disclosure.

To prove the beneficial effects of the present disclosure, the protein product prepared in each of Examples 1, 2, and 3 were added to deionized water, and the resulting mixture was gently shaken to obtain a 10 mg/mL protein product suspension. The protein product suspension was subjected to performance tests, and specific tests were as follows:

1. Immobilization Capacity Verification for the Protein Product

Figure 1A:
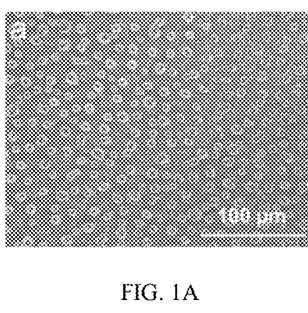
FIGS. 1A-1C show scanning electron microscopy (SEM) images of a blank lotus leaf surface, a lotus leaf surface directly sprayed with a pesticide buprofezin, and a lotus leaf surface sprayed with the protein product in Example 1.
Figure 1B:
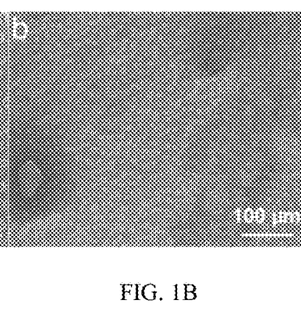
Figure 1C:
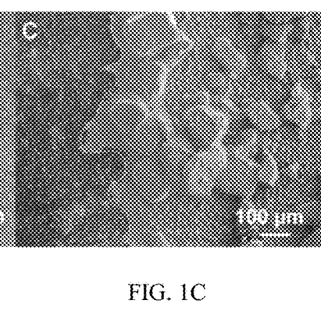

A lotus leaf with superhydrophobicity (as shown in FIG. 1A) was taken as an example. A 10 mg/mL buprofezin suspension (prepared with deionized water) and a 10 mg/mL suspension of the protein product in Example 1 were each evenly sprayed on lotus leaves of 5 cm×5 cm. The lotus leaves were rinsed with deionized water, naturally dried, and observed under a scanning electron microscope. Test results showed that an immobilization rate of the buprofezin on the surface of the lotus leaves was very low (as shown in FIG. 1B), while a protein film formed from the protein product of the present disclosure could immobilize the buprofezin on the lotus leaves (as shown in FIG. 1C).

2. Clearance Verification for the Protein Product

Figure 2A:
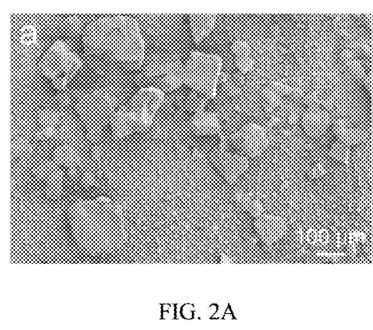
FIGS. 2A-2B show SEM images of a lotus leaf surface before and after the protein product in Example 1 is cleared by Vc and commercially available fruit and vegetable detergents.
Figure 2B:
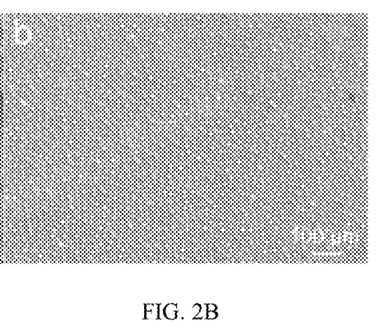

The lotus leaf formed with the protein film in test 1 was soaked in water, a Vc aqueous solution, and various commercially available fruit and vegetable detergents (such as Fairy, WhiteCat, Kao, and myk+) for 20 min and then taken out, naturally dried, and observed under a scanning electron microscope. Test results showed that the protein film formed from the protein product could not be cleared by water (as shown in FIG. 2A) but could be effectively cleared by the Vc aqueous solution or the fruit and vegetable detergents (as shown in FIG. 2B).

3. Weather Resistance Verification for the Protein Product

Figure 3A:
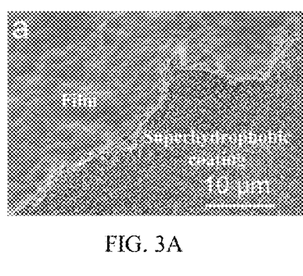
FIG. 3A shows the protein film formed on a superhydrophobic surface.
Figure 3B:
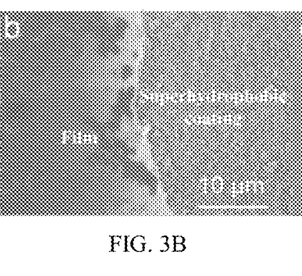
FIG. 3B shows the protein film placed in a high-temperature environment (80° C.) for 30 d.
Figure 3C:
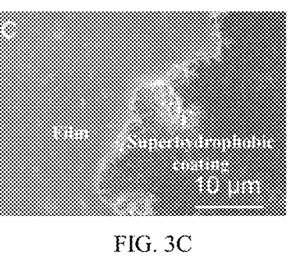
FIG. 3C shows the protein film placed in a low-temperature environment (−24° C.) for 30 d.
Figure 3D:
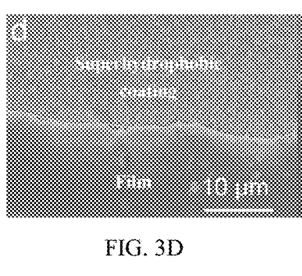
FIG. 3D shows the protein film placed in a simulated light environment (20,000 LX) for 30 d.
Figure 3E:
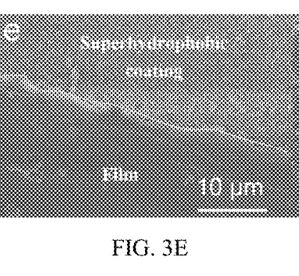
FIG. 3E shows the protein film placed in a simulated acid rain environment (pH=4) for 30 d.
Figure 3F:
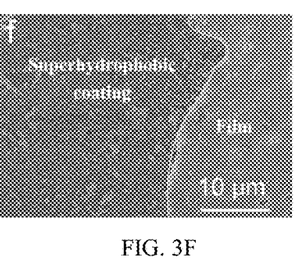
FIG. 3F shows the protein film placed in a microbial environment (37° C.) for 90 d.

A 10 mg/mL suspension of the protein product in Example 1 was sprayed on a superhydrophobic surface (as shown in FIG. 3A), and then the superhydrophobic surface was placed in an 80° C. environment for 30 d, a −24° C. environment for 30 d, a simulated light environment for 30 d (20,000 LX), an acidic environment with pH of 4 for 30 d, and a microbial environment for 90 d, respectively. A sample placed in the normal environment at room temperature was taken as a control sample. SEM results showed that the protein product of the present disclosure exhibited high stability in each of the above-mentioned various environments and could achieve a long-term immobilization effect in the high-temperature (as shown in FIG. 3B), low-temperature (as shown in FIG. 3C), light (as shown in FIG. 3D), acid rain (as shown in FIG. 3E), and microbial environments (as shown in FIG. 3F).

4. Verification for the Stability of the Protein Product in Organic Solvents

Figure 4A:
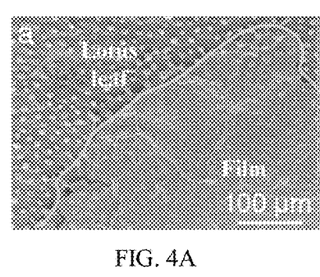
FIGS. 4A-4F show SEM images of the protein film formed on a lotus leaf from the protein product of Example 1 before and after being soaked in different organic solvents for 2 h.
Figure 4B:
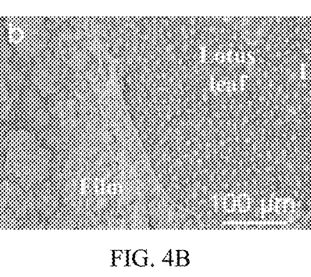
Figure 4C:
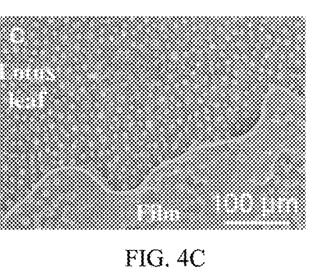
Figure 4D:
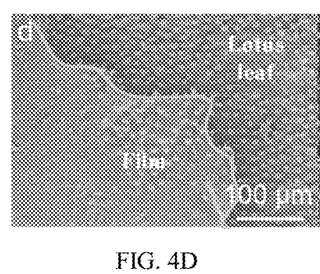
Figure 4E:
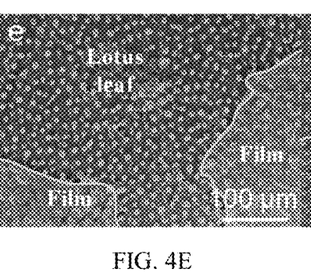
Figure 4F:
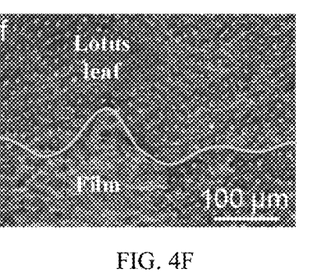

A 10 mg/mL suspension of the protein product in Example 1 was sprayed on a lotus leaf (as shown in FIG. 4A). The lotus leaf was soaked in ethanol, n-hexane, petroleum ether, DMF, and chloroform for 2 h and then taken out and observed under a scanning electron microscope (as shown in FIGS. 4A-4F). Test results showed that the protein product of the present disclosure could stably exist in ethanol (as shown in FIG. 4B), n-hexane (as shown in FIG. 4C), petroleum ether (as shown in FIG. 4D), chloroform (as shown in FIG. 4E), and DMF (as shown in FIG. 4F).

5. Insect Control Performance Verification

Figure 5:
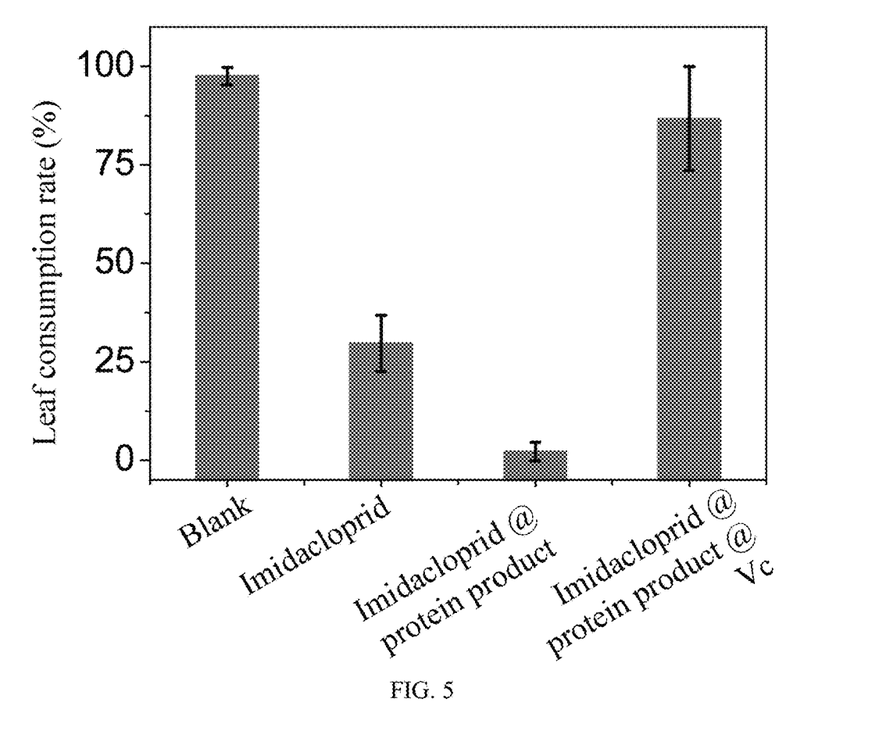
FIG. 5 shows the consumption rate of leaves in each group counted in an insect control test.

Cabbage leaves each at a size of 5 cm×5 cm were divided into four groups with four cabbage leaves in each group. Three of the four groups were respectively sprayed with water, a 10 mg/mL imidacloprid suspension (prepared with deionized water), and a 10 mg/mL suspension of the protein product in Example 2. The last group was sprayed with a 10 mg/mL suspension of the protein product in Example 2 and then treated with a Vc aqueous solution or a fruit and vegetable detergent 2 h later. The four groups of leaves were respectively administered to four groups of snails with 10 snails in each group. The area of leaves consumed by snails was counted (as shown in FIG. 5). The consumption rate by the snails for the untreated cabbage leaf group was almost 100%. The consumption rate by the snails for the cabbage leaves simply sprayed with the imidacloprid suspension was about 30%. The consumption rate by the snails for the cabbage leaves sprayed with the suspension of the protein product of the present disclosure was reduced to 2% because the protein product of the present disclosure could effectively immobilize the pesticide imidacloprid on the cabbage leaves. The consumption rate by the snails for the cabbage leaves that were first sprayed with the suspension of the protein product of the present disclosure and then treated with the Vc aqueous solution or the fruit and vegetable detergent was increased to 80%. These results showed that the protein product of the present disclosure exhibited a high immobilization rate for the pesticide imidacloprid and could be cleared by the Vc aqueous solution or the fruit and vegetable detergent to ensure food safety.

Figure 6:
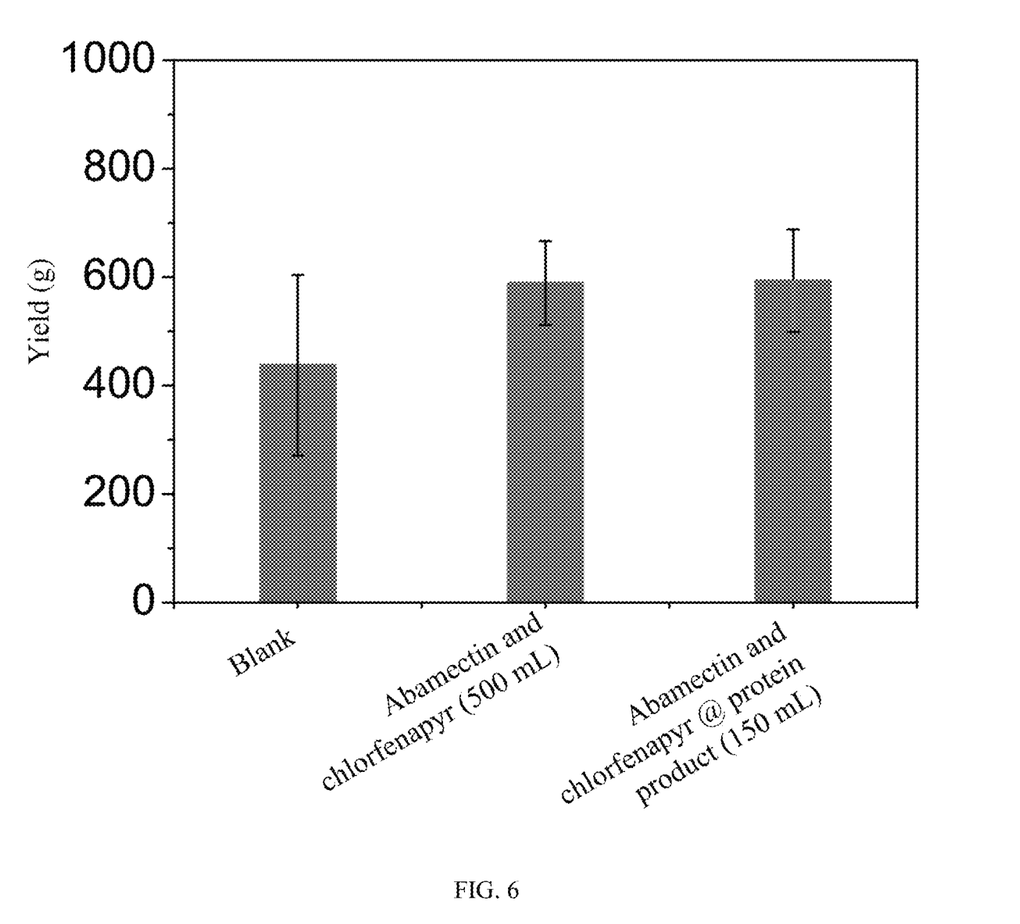
FIG. 6 shows yield data of soybean in an outdoor farmland test.

6. Determination of the Application Effects of a Loss Control Agent in Agriculture by a Farmland Test An outdoor soybean experimental field was divided into three blocks with each block having dimensions of 3 m×1.5 m. The three blocks were treated as follows: the first block was a blank group that was untreated; the second block was sprayed with 500 mL of a 10 mg/mL abamectin and chlorfenapyr suspension (prepared with deionized water); and the third block was sprayed with 150 mL of a 10 mg/mL suspension of the protein product in Example 3. Test results showed that the protein product of the present disclosure could effectively immobilize the abamectin and chlorfenapyr on soybean leaves and control the consumption by bean caterpillar for soybean leaves. Compared with the untreated blank group, the protein product of the present disclosure exhibited a positive impact on the yield of beans. Compared with the second block, the protein product of the present disclosure reduced the dosage of abamectin and chlorfenapyr by 60% to 70% (as shown in FIG. 6).

What is claimed is:

1. A protein product capable of immobilizing a target and being cleared as required comprising the following components in parts by weight:

10 to 600 parts of a protein,
10 to 600 parts of a protein modifier, and
100 parts of a matter to be immobilized, wherein the protein is at least one selected from the group consisting of lysozyme, bovine serum albumin (BSA), human serum albumin (HSA), whey albumin, insulin, α-lactalbumin, fibrinogen, β-lactoglobulin, ribonuclease A, cytochrome c, α-amylase, horseradish peroxidase (HRP), pepsin, myoglobin, albumin, collagen, keratin, soybean protein, lactoferrin, hemoglobin, DNA polymerase, and casein;

the matter to be immobilized is a pesticide, the pesticide is buprofezin, imidacloprid, abamectin, chlofenapyr, or a combination thereof; and the protein modifier is a strong oxidizing agent or a strong reducing agent; when the matter to be immobilized is the pesticide, the strong reducing agent is at least one selected from the group consisting of dithiothreitol (DTT), β-mercaptoethanol (β-ME), tris(2-carboxyethyl) phosphine hydrochloride (TCEP-HCL), cysteine, and reduced glutathione, and the strong oxidizing agent is at least one selected from the group consisting of a trivalent cobalt salt, a chlorate, potassium permanganate, a persulfate, potassium dichromate, concentrated sulfuric acid, hydrochloric acid, nitric acid, hydrobromic acid, hydroiodic acid, perchloric acid, ozone, hydrogen peroxide, a fluorine gas, a chlorine gas, sodium bismuthate, periodic acid, sodium ferrate, lead dioxide, guanidine hydrochloride (GuHCl), urea, trifluoroethanol (TFE), hexafluoroisopropanol (HFIP), and trifluoroacetic acid (TFA);

when the matter to be immobilized is a solid, the protein, the protein modifier, and the matter to be immobilized are directly mixed to prepare the protein product; and when in use, the protein product is mixed with water, surfactant-containing water, or an organic solvent, and then a resulting mixture is sprayed, smeared, dip-coated, spin-coated, or sputtered onto a target surface;

when the matter to be immobilized is a liquid, the protein and the protein modifier are thoroughly mixed to obtain a first component, the matter to be immobilized is set as a second component, and the first component and the second component constitute the protein product; and when in use, the first component and the second component are mixed and then sprayed, smeared, dip-coated, spin-coated, or sputtered onto the target surface.

2. The protein product capable of immobilizing the target and being cleared as required according to claim 1, comprising the following components in parts by weight:

50 to 500 parts of the protein,
50 to 500 parts of the protein modifier, and
100 parts of the matter to be immobilized.

3. The protein product capable of immobilizing the target and being cleared as required according to claim 1, comprising the following components in parts by weight:

100 to 300 parts of the protein,
100 to 300 parts of the protein modifier, and
100 parts of the matter to be immobilized.

4. The protein product capable of immobilizing the target and being cleared as required according to claim 1, wherein when the matter to be immobilized is solid pesticide, the organic solvent is at least one selected from the group consisting of benzene, toluene, xylene, heavy benzene, trimethylbenzene, naphthalene, alkylnaphthalene, methyl ethyl benzene, propylbenzene, chlorobenzene, carbon tetrachloride (CTC), kerosene, motor oil, white oil, diesel oil, liquid paraffin, white gasoline, isoparaffin oil, heavy oil, pentane, hexane, octane, cyclohexane, cyclohexanone, dichlorobenzene, dichloromethane (DCM), dichloroethane (DCE), chloroform, methanol, ethanol, propanol, isopropanol, butanol, isobutanol, ethylene glycol (EG), butylene glycol (BG), propylene glycol (PG), glycerol, octanol, isopentanol, the TFE, the HFIP, the TFA, diethyl ether, petroleum ether, ethylene glycol methyl ether, ethylene glycol ethyl ether, ethylene glycol monobutyl ether, ethylene glycol ether, propylene glycol monomethyl ether, propylene glycol ether, propylene glycol oxide, ethyl acetate, sec-butyl acetate, isoamyl citrate, fatty acid methyl ester (FAME), methyl acetate, the ethyl acetate, propyl acetate, butyl acetate, acetone, butanone, methyl butyl ketone (MBK), methyl isobutyl ketone (MIBK), pyrrolidone, N-methylpyrrolidone (NMP), methyl ethyl ketone (MEK), acetophenone, the MIBK, unsaturated aliphatic ketone, the cyclohexanone, isophorone, methyl ethyl acetone, acetonitrile, pyridine, phenol, caprylamide, N,N-dimethylformamide (DMF), capramide, dimethylsulfoxide (DMSO), triethyl phosphate (TEP), eucalyptus oil, soybean oil, corn oil, cottonseed oil, sunflower oil, pine oil, jatropha oil, turpentine oil, rosin water, rapeseed oil, paraffin, advanced aliphatic hydrocarbon oil, epoxidized soybean oil (ESO), methylated vegetable oil, methyl phthalate, dilauryl ester, and methyl benzoate.

5. The protein product capable of immobilizing the target and being cleared as required according to claim 1, wherein when the matter to be immobilized is the solid and is one selected from the group consisting of the pesticide and the chemical fertilizer, a surfactant is at least one selected from the group consisting of dodecylbenzenesulfonic acid (DBSA), triethanolamine lauryl sulfate, sec-alkyl sodium sulfate, fatty alcohol sodium isethionate, sodium N-lauroyl-sarcosinate, sodium N-lauroyl glutamate, amidopolyoxyethylene ether magnesium sulfate, sodium polyoxyethylene lauryl ether carboxylate, lauryl phosphate, potassium lauryl phosphate, triethanolamine lauryl phosphate, disodium laureth sulfosuccinate, sodium a-alkyl sulfonate, cocofatty acid monoethanol amide, cocofatty acid diethanol amide, the cocofatty acid monoethanol amide, lauryl betaine, dodecyl dimethyl amine oxide, octadecyl trimethyl ammonium chloride, cetyl trimethyl ammonium chloride, ceteareth-20, lauryl glucoside polyglycerin, fatty alcohol ether-6, stearyl alcohol, fatty alcohol ether-25, oleyl ether, glycerol monostearate, polyacrylamide (PAM), acrylamide copolymer, sorbitol polyoxyethylene ether, lignosulfonate, saponin, tea-seed cake, alkyl naphthalene sulfonate, sodium naphthalene sulfonic acid-formaldehyde condensate, and sodium polycarboxylate.

\* \* \* \* \*